United States Patent
Shi et al.

(10) Patent No.: US 11,567,296 B2
(45) Date of Patent: Jan. 31, 2023

(54) CAMERA OPTICAL LENS

(71) Applicant: AAC Optics Solutions Pte. Ltd., Singapore (SG)

(72) Inventors: Rongbao Shi, Shenzhen (CN); Jia Chen, Shenzhen (CN); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 282 days.

(21) Appl. No.: 16/991,023

(22) Filed: Aug. 12, 2020

(65) Prior Publication Data
US 2021/0048614 A1    Feb. 18, 2021

(30) Foreign Application Priority Data
Aug. 16, 2019  (CN) .......................... 201910760417.0

(51) Int. Cl.
*G02B 9/34* (2006.01)
*G02B 13/00* (2006.01)

(52) U.S. Cl.
CPC ............. *G02B 13/004* (2013.01); *G02B 9/34* (2013.01)

(58) Field of Classification Search
CPC ............................... G02B 13/004; G02B 9/34
See application file for complete search history.

(56) References Cited

FOREIGN PATENT DOCUMENTS

CN           206460205 U   *   9/2017   ............. G02B 13/00

* cited by examiner

*Primary Examiner* — Joseph P Martinez
(74) *Attorney, Agent, or Firm* — W&G Law Group

(57) ABSTRACT

Provided is a camera optical lens including, sequentially from an object side to an image side: a first lens having a positive refractive power; a second lens having a negative refractive power; a third lens having a positive refractive power; and a fourth lens having a negative refractive power. The camera optical lens satisfies following conditions: $-0.75 \leq f1/f2 \leq -0.67$; $0.32 \leq f4/f2 \leq 0.40$; $5.00 \leq R7/R8 \leq 6.00$; and $1.40 \leq d1/d2 \leq 3.20$, where f1, f2, and f4 denote focal lengths of the first, second and fourth lenses, respectively; R7 and R8 denote curvature radiuses of an object side surface and an image side surface of the fourth lens, respectively; d1 denotes an on-axis thickness of the first lens; and d2 denotes an on-axis distance from an image side surface of the first lens to an object side surface of the second lens. The camera optical lens can achieve high optical performance while satisfying design requirements for ultra-thin, wide-angle lenses.

8 Claims, 15 Drawing Sheets

CAMERA OPTICAL LENS

TECHNICAL FIELD

The present invention relates to the field of optical lens, and more particularly, to a camera optical lens suitable for handheld terminal devices, such as smart phones or digital cameras, and camera devices, such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is becoming increasingly higher. Although the common four-piece lens has good optical performance, its refractive power, lens spacing and lens shape settings still have some irrationality, such that the lens structure cannot achieve high optical performance while satisfying design requirements for ultra-thin, wide-angle lenses.

SUMMARY

In view of the problems, the present invention aims to provide a camera optical lens, which can achieve high optical performance while satisfying requirements for ultra-thin, wide-angle lenses.

In an embodiment, the present invention provides a camera optical lens. The camera optical lens includes, sequentially from an object side to an image side: a first lens having a positive refractive power; a second lens having a negative refractive power; a third lens having a positive refractive power; and a fourth lens having a negative refractive power. The camera optical lens satisfies following conditions: $-0.75 \le f1/f2 \le -0.67$; $0.32 \le f4/f2 \le 0.40$; $5.00 \le R7/R8 \le 6.00$; and $1.40 \le d1/d2 \le 3.20$, where f1 denotes a focal length of the first lens; f2 denotes a focal length of the second lens; f4 denotes a focal length of the fourth lens; R7 denotes a curvature radius of an object side surface of the fourth lens; R8 denotes a curvature radius of an image side surface of the fourth lens; d1 denotes an on-axis thickness of the first lens; and d2 denotes an on-axis distance from an image side surface of the first lens to an object side surface of the second lens.

As an improvement, the camera optical lens further satisfies a following condition: $-0.60 \le R3/R4 \le 0.20$, where R3 denotes a curvature radius of the object side surface of the second lens; and R4 denotes a curvature radius of an image side surface of the second lens.

As an improvement, the camera optical lens further satisfies following conditions: $0.46 \le f1/f \le 1.78$; $-3.21 \le (R1+R2)/(R1-R2) \le -0.53$; and $0.07 \le d1/TTL \le 0.32$, where f denotes a focal length of the camera optical lens; R1 denotes a curvature radius of an object side surface of the first lens; R2 denotes a curvature radius of the image side surface of the first lens; and TTL denotes a total optical length from the object side surface of the first lens to an image plane of the camera optical lens along an optic axis.

As an improvement, the camera optical lens further satisfies following conditions: $-3.45 \le f2/f \le -0.88$; $-2.95 \le (R3+R4)/(R3-R4) \le -0.17$; and $0.03 \le d3/TTL \le 0.15$, where f denotes a focal length of the camera optical lens; R3 denotes a curvature radius of the object side surface of the second lens; R4 denotes a curvature radius of an image side surface of the second lens; d3 denotes an on-axis thickness of the second lens; and TTL denotes a total optical length from an object side surface of the first lens to an image plane of the camera optical lens along an optic axis.

As an improvement, the camera optical lens further satisfies following conditions: $0.23 \le f3/f \le 0.76$; $0.39 \le (R5+R6)/(R5-R6) \le 1.76$; and $0.09 \le d5/TTL \le 0.33$, where f denotes a focal length of the camera optical lens; f3 denotes a focal length of the third lens; R5 denotes a curvature radius of an object side surface of the third lens; R6 denotes a curvature radius of an image side surface of the third lens; d5 denotes an on-axis thickness of the third lens; and TTL denotes a total optical length from an object side surface of the first lens to an image plane of the camera optical lens along an optic axis.

As an improvement, the camera optical lens further satisfies following conditions: $-1.25 \le f4/f \le -0.32$; $0.70 \le (R7+R8)/(R7-R8) \le 2.25$; and $0.04 \le d7/TTL \le 0.19$, where f denotes a focal length of the camera optical lens; d7 denotes an on-axis thickness of the fourth lens; and TTL denotes a total optical length from an object side surface of the first lens to an image plane of the camera optical lens along an optic axis.

As an improvement, the camera optical lens further satisfies a following condition: $TTL/IH \le 1.68$, where TTL denotes a total optical length from an object side surface of the first lens to an image plane of the camera optical lens along an optic axis; and IH denotes an image height of the camera optical lens.

As an improvement, the camera optical lens further satisfies a following condition: $0.91 \le f12/f \le 3.71$, where f denotes a focal length of the camera optical lens; and f12 denotes a combined focal length of the first lens and the second lens.

The present invention has advantageous effects in that the camera optical lens according to the present invention has excellent optical performance, and is ultra-thin, wide-angle, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figure and the embodiments. It should be understood the specific embodiments described hereby is only to explain the disclosure, not intended to limit the disclosure.

Embodiment 1

Figure 1:
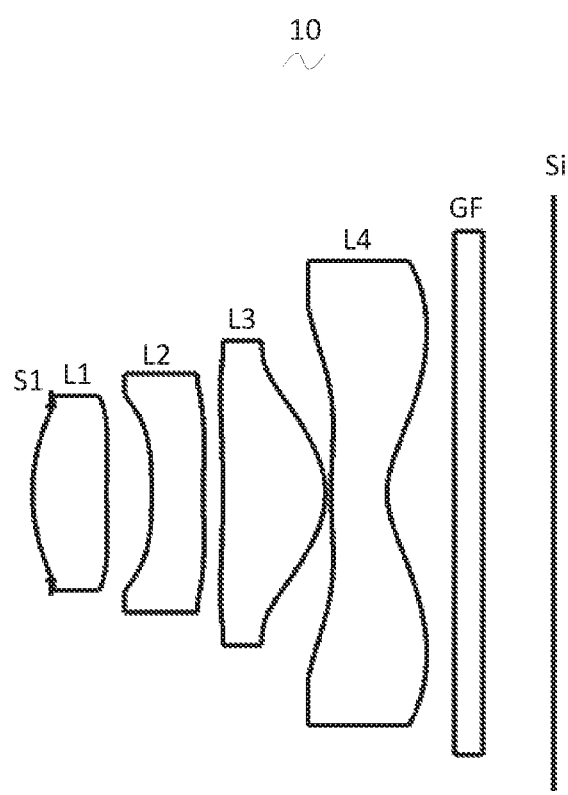
FIG. 1 is a schematic diagram of a structure of a camera optical lens in accordance with Embodiment 1 of the present invention.

Referring to FIG. 1, the present invention provides a camera optical lens 10. FIG. 1 shows the camera optical lens 10 according to Embodiment 1 of the present invention. The camera optical lens 10 includes four lenses. Specifically, the camera optical lens 10 includes, sequentially from an object side to an image side, an aperture S1, a first lens L1 having a positive refractive power, a second lens L2 having a negative refractive power, a third lens L3 having a positive refractive power, and a fourth lens L4 having a negative refractive power. An optical element such as a glass filter (GF) can be arranged between the fourth lens L4 and an image plane Si.

A focal length of the first lens L1 is defined as f1, and a focal length of the second lens L2 is defined as f2. The camera optical lens 10 should satisfy a condition of $-0.75 \leq f1/f2 \leq -0.67$, which specifies a ratio of the focal length of the first lens L1 to the focal length of the second lens L2. This can effectively balance spherical aberrations and a field curvature of the system.

A focal length of the fourth lens L4 is defined as f4. The camera optical lens 10 should satisfy a condition of $0.32 \leq f4/f2 \leq 0.40$, which specifies a ratio of the focal length of the fourth lens L4 to the focal length of the second lens L2. The appropriate distribution of the focal lengths leads to better imaging quality and a lower sensitivity.

A curvature radius of an object side surface of the fourth lens L4 is defined as R7, and a curvature radius of an image side surface of the fourth lens L4 is defined as R8. The camera optical lens 10 should satisfy a condition of $5.00 \leq R7/R8 \leq 6.00$, which specifies a shape of the fourth lens L4. This can facilitate correction of an off-axis aberration with development towards ultra-thin, wide-angle lenses.

An on-axis thickness of the first lens L1 is defined as d1, and an on-axis distance from an image side surface of the first lens L1 to an object side surface of the second lens L2 is defined as d2. The camera optical lens 10 should satisfy a condition of $1.40 \leq d1/d2 \leq 3.20$, which specifies a ratio of the on-axis thickness of the first lens L1 to the on-axis distance from the image side surface of the first lens L1 to the object side surface of the second lens L2. When the condition is satisfied, reduction of the total length can be facilitated, thereby achieving ultra-thin lenses.

A curvature radius of the object side surface of the second lens L2 is defined as R3, and a curvature radius of an image side surface of the second lens L2 is defined as R4. The camera optical lens 10 should satisfy a condition of $-0.60 \leq R3/R4 \leq 0.20$, which specifies a shape of the second lens L2. This can facilitate correction of an on-axis aberration.

A focal length of the camera optical lens 10 is defined as f, and the focal length of the first lens L1 is defined as f1. The camera optical lens 10 should satisfy a condition of $0.46 \leq f1/f \leq 1.78$, which specifies a ratio of the focal length of the first lens L1 to the focal length of the camera optical lens 10. When the condition is satisfied, the first lens L1 can have an appropriate positive refractive power, thereby facilitate correction of aberrations with development towards ultra-thin, wide-angle lenses.

The curvature radius of an object side surface of the first lens L1 is defined as R1, and a curvature radius of the image side surface of the first lens L1 is defined as R2. The camera optical lens 10 should satisfy a condition of $-3.21 \leq (R1+R2)/(R1-R2) \leq -0.53$. When the condition is satisfied, a shape of the first lens L1 can be reasonably controlled, so that the first lens L1 can effectively correct spherical aberrations of the system.

A total optical length from the object side surface of the first lens L1 to an image plane of the camera optical lens 10 along an optic axis is defined as TTL, and an on-axis thickness of the first lens is defined as d1. The camera optical lens 10 should satisfy a condition of $0.07 \leq d1/TTL \leq 0.32$. When the condition is satisfied, ultra-thin lenses can be achieved.

The focal length of the second lens L2 is defined as f2, and the focal length of the camera optical lens 10 is defined as f. The camera optical lens 10 should satisfy a condition of $-3.45 \leq f2/f \leq -0.88$, which specifies a ratio of the focal length of the second lens L2 to the focal length of the camera optical lens 10. By controlling the negative refractive power of the second lens L2 within the reasonable range, correction of aberrations of the optical system can be facilitated.

A curvature radius of the object side surface of the second lens L2 is defined as R3, and a curvature radius of an image side surface of the second lens L2 is defined as R4. The camera optical lens 10 should satisfy a condition of $-2.95 \leq (R3+R4)/(R3-R4) \leq -0.17$, which specifies a shape of the second lens L2. This can facilitate correction of an on-axis aberration with development towards ultra-thin, wide-angle lenses.

An on-axis thickness of the second lens L2 is defined as d3, and the total optical length from the object side surface of the first lens L1 to the image plane of the camera optical lens 10 along the optic axis is defined as TTL. The camera optical lens 10 should satisfy a condition of $0.03 \leq d3/TTL \leq 0.15$. When the condition is satisfied, ultra-thin lenses can be achieved.

The focal length of the third lens L3 is defined as f3, and the focal length of the camera optical lens 10 is defined as f. The camera optical lens 10 should satisfy a condition of $0.23 \leq f3/f \leq 0.76$. The appropriate distribution of the refractive power leads to better imaging quality and a lower sensitivity.

The curvature radius of the object side surface of the third lens L3 is defined as R5, and a curvature radius of an image side surface of the third lens L3 is defined as R6. The camera optical lens 10 should satisfy a condition of $0.39 \leq (R5+R6)/(R5-R6) \leq 1.76$. This can effectively control a shape of the third lens L3, thereby facilitating shaping of the third lens L3 and avoiding bad shaping and generation of stress due to the overly large surface curvature of the third lens L3.

The on-axis thickness of the third lens L3 is defined as d5, and the total optical length from the object side surface of the first lens L1 to the image plane of the camera optical lens 10 along the optic axis is defined as TTL. The camera optical lens 10 should satisfy a condition of $0.09 \leq d5/TTL \leq 0.33$. When the condition is satisfied, ultra-thin lenses can be achieved.

The focal length of the fourth lens L4 is defined as f4, and the focal length of the camera optical lens 10 is defined as f. The camera optical lens 10 should satisfy a condition of $-1.25 \leq f4/f \leq -0.32$. The appropriate distribution of the refractive power leads to better imaging quality and a lower sensitivity.

A curvature radius of the object side surface of the fourth lens L4 is defined as R7, and a curvature radius of the image side surface of the fourth lens L4 is defined as R8. The camera optical lens 10 should satisfy a condition of $0.70 \leq (R7+R8)/(R7-R8) \leq 2.25$, which specifies a shape of the fourth lens L4. This can facilitate correction of an off-axis aberration with development towards ultra-thin, wide-angle lenses.

The on-axis thickness of the fourth lens L4 is defined as d7, and the total optical length from the object side surface of the first lens L1 to the image plane of the camera optical lens 10 along the optic axis is defined as TTL. The camera optical lens 10 should satisfy a condition of $0.04 \leq d7/TTL \leq 0.19$. When the condition is satisfied, ultra-thin lenses can be achieved.

Further, the total optical length from the object side surface of the first lens to the image plane of the camera optical lens along the optic axis is defined as TTL, and an image height of the camera optical lens 10 is defined as IH. The camera optical lens 10 should satisfy a condition of $TTL/IH \leq 1.68$. When the condition is satisfied, ultra-thin lenses can be achieved.

A combined focal length of the first lens L1 and the second lens L2 is defined as f12. The camera optical lens 10 should satisfy a condition of $0.91 \leq f12/f \leq 3.71$. This can eliminate aberration and distortion of the camera optical lens 10, suppress the back focal length of the camera optical lens 10, and maintain miniaturization of the camera lens system group.

When the above conditions are satisfied, the camera optical lens 10 will have high optical imaging performance while satisfying design requirements for ultra-thin, wide-angle lenses. With these characteristics, the camera optical lens 10 is especially suitable for high-pixel camera optical lens assembly of mobile phones and WEB camera optical lenses formed by imaging elements such as CCD and CMOS.

In the following, examples will be used to describe the camera optical lens 10 of the present invention. The symbols recorded in each example will be described as follows.

The focal length, on-axis distance, curvature radius, on-axis thickness, inflexion point position, and arrest point position are all in units of mm.

TTL: Optical length (the total optical length from the object side surface of the first lens L1 to the image plane Si of the camera optical lens along the optic axis) in mm.

In an example, inflexion points and/or arrest points can be arranged on the object side surface and/or image side surface of the lens, so as to satisfy the demand for the high quality imaging. The description below can be referred to for specific implementations.

Table 1 and Table 2 show design data of the camera optical lens 10 according to Embodiment 1 of the present invention.

TABLE 1

|  | R |  | d | nd |  | vd |
|---|---|---|---|---|---|---|
| S1 | ∞ | d0= | −0.135 |  |  |  |
| R1 | 1.502 | d1= | 0.547 | nd1 | 1.5444 v1 | 55.82 |
| R2 | 10.851 | d2= | 0.334 |  |  |  |
| R3 | −4.440 | d3= | 0.381 | nd2 | 1.6610 v2 | 20.53 |
| R4 | 8.928 | d4= | 0.145 |  |  |  |
| R5 | −8.961 | d5= | 0.755 | nd3 | 1.5444 v3 | 55.82 |
| R6 | −0.664 | d6= | 0.042 |  |  |  |
| R7 | 3.165 | d7= | 0.412 | nd4 | 1.5346 v4 | 55.69 |
| R8 | 0.600 | d8= | 0.500 |  |  |  |
| R9 | ∞ | d9= | 0.210 | ndg | 1.5168 vg | 64.17 |
| R10 | ∞ | d10= | 0.524 |  |  |  |

In the table, meanings of various symbols will be described as follows.

S1: aperture;

R: curvature radius of an optical surface, central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of an object side surface of the optical filter GF;

R10: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the optical filter GF;

d9: on-axis thickness of the optical filter GF;

d10: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

vg: abbe number of the optical filter GF.

Table 2 shows aspheric surface data of respective lens in the camera optical lens 10 according to Embodiment 1 of the present invention.

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; and P4R1 and P4R2 represent the object side surface and the image side surface of the fourth lens L4, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 0.645 | 0 | 0 |
| P1R2 | 1 | 0.235 | 0 | 0 |
| P2R1 | 0 | 0 | 0 | 0 |
| P2R2 | 2 | 0.215 | 0.785 | 0 |
| P3R1 | 2 | 0.475 | 1.045 | 0 |
| P3R2 | 2 | 0.725 | 1.185 | 0 |
| P4R1 | 3 | 0.265 | 1.115 | 1.385 |
| P4R2 | 1 | 0.445 | 0 | 0 |

TABLE 4

| | Number of arrest points | Arrest point position 1 | Arrest point position 2 |
|---|---|---|---|
| P1R1 | 0 | 0 | 0 |
| P1R2 | 1 | 0.375 | 0 |
| P2R1 | 0 | 0 | 0 |
| P2R2 | 2 | 0.375 | 0.905 |
| P3R1 | 1 | 0.775 | 0 |
| P3R2 | 2 | 1.145 | 1.215 |
| P4R1 | 1 | 0.505 | 0 |
| P4R2 | 1 | 1.255 | 0 |

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | −3.6594E+00 | 9.5143E−02 | 1.2954E−01 | −1.5598E+00 | 7.1079E+00 | −2.0198E+01 | 3.0342E+01 | −1.8976E+01 |
| R2 | −2.8056E+01 | −1.4988E−01 | 1.8271E−01 | −2.4549E+00 | 9.1704E+00 | −2.1198E+01 | 2.6958E+01 | −1.4557E+01 |
| R3 | 2.7852E+01 | −3.9007E−01 | 4.3337E−01 | −3.2543E+00 | 1.1956E+01 | −2.9063E+01 | 4.3445E+01 | −2.5698E+01 |
| R4 | −1.0403E+02 | −2.2130E−01 | 2.9877E−01 | −8.2603E−01 | 1.6890E+00 | −2.6098E+00 | 2.6008E+00 | −1.0074E+00 |
| R5 | 1.2675E+01 | 4.4841E−02 | −1.0559E−01 | 5.1989E−01 | −1.0670E+00 | 1.1297E+00 | −5.8503E−01 | 1.1444E−01 |
| R6 | −4.0220E+00 | −4.2490E−01 | 1.0083E+00 | −1.9183E+00 | 2.4925E+00 | −1.7054E+00 | 5.6881E−01 | −7.4331E−02 |
| R7 | −1.0677E+02 | −1.6480E−01 | −1.2214E−01 | 9.4858E−02 | −5.5035E−02 | 1.5801E−02 | −2.5123E−03 | 1.4274E−04 |
| R8 | −4.9594E+00 | −1.7531E−01 | 1.2556E−01 | −7.4367E−02 | 3.0343E−02 | −7.8928E−03 | 1.1667E−03 | −7.5298E−05 |

In Table 2, k is a conic coefficient, and A4, A6, A8, A10, A12, A14 and A16 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

In the present embodiment, an aspheric surface of each lens surface uses the aspheric surfaces shown in the above condition (1). However, the present invention is not limited to the aspherical polynomial form shown in the condition (1).

Figure 2:
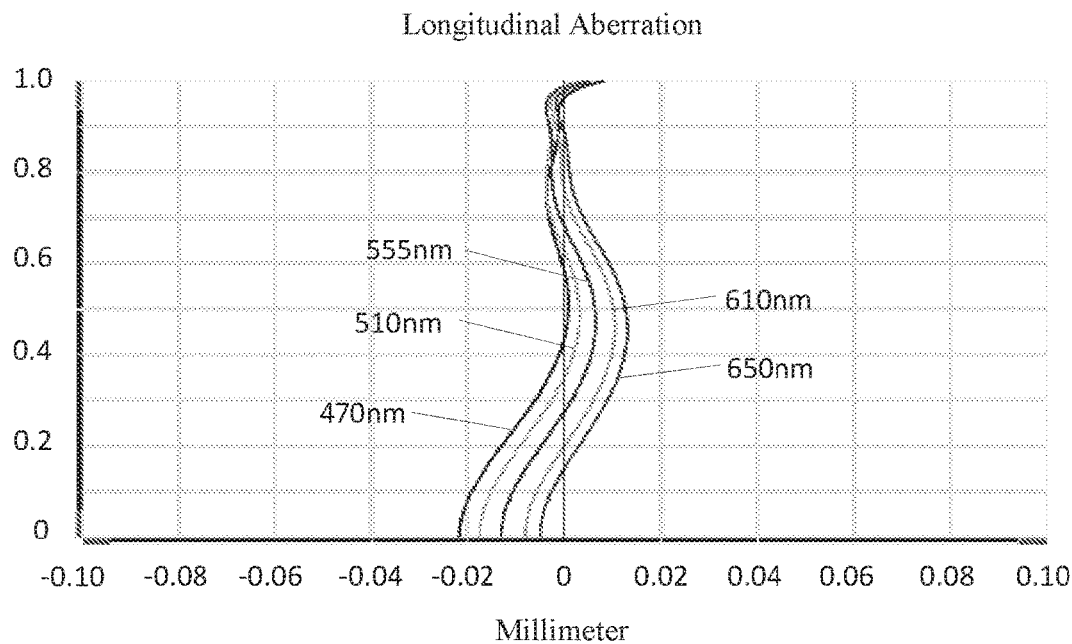
FIG. 2 is a schematic diagram of a longitudinal aberration of the camera optical lens shown in FIG. 1.
Figure 3:
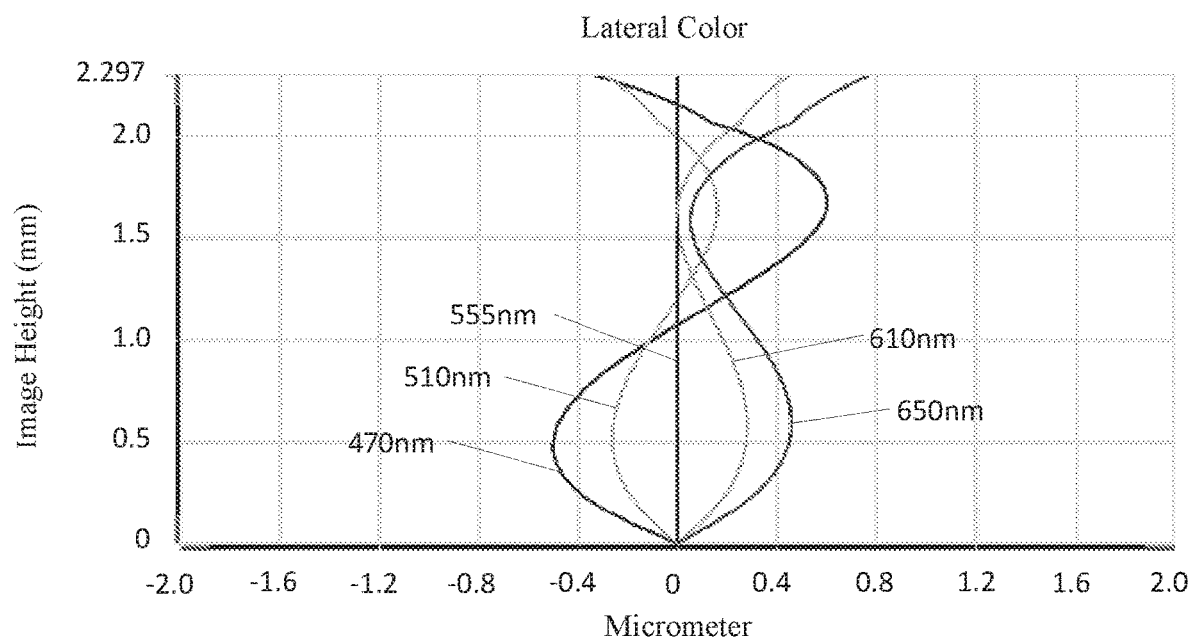
FIG. 3 is a schematic diagram of a lateral color of the camera optical lens shown in FIG. 1.
Figure 4:
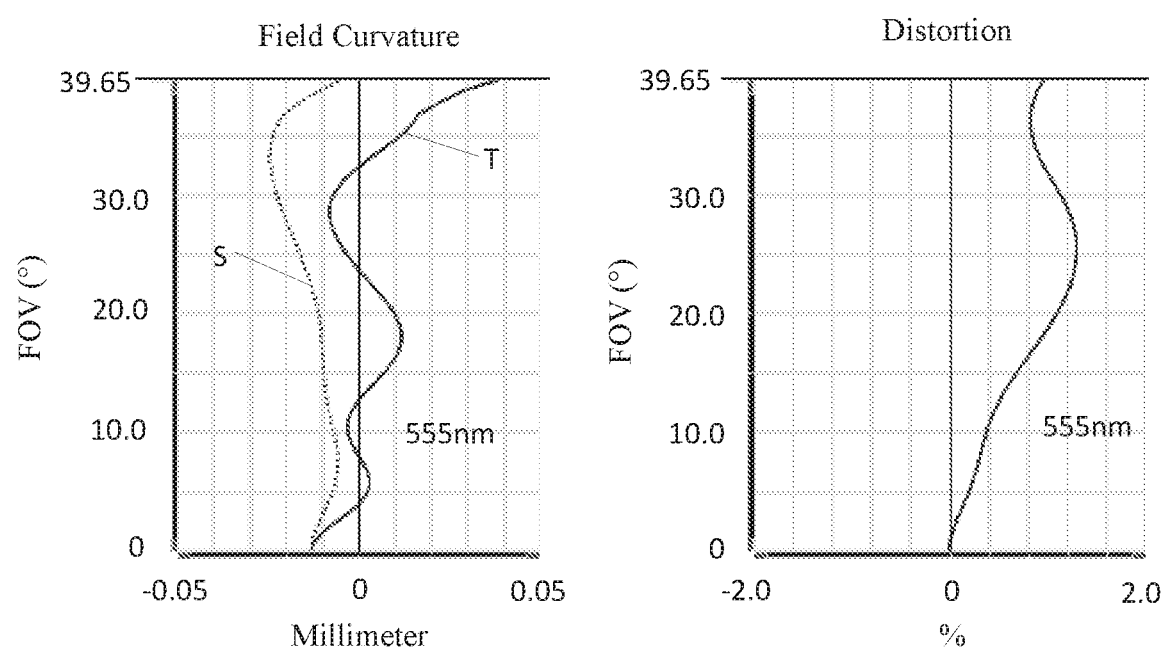
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 470 nm, 510 nm, 555 nm, 610 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 21 below further lists various values of Embodiments 1, 2, 3, 4 and 5 and values corresponding to parameters which are specified in the above conditions.

As shown in Table 21, Embodiment 1 satisfies the respective conditions.

In this embodiment, the entrance pupil diameter of the camera optical lens is 1.349 mm. The image height IH of the camera optical lens is 2.297 mm. The FOV (field of view) along a diagonal direction is 79.30°. Thus, the camera optical lens 10 can provide an ultra-thin, wide-angle lens while having on-axis and off-axis aberrations sufficiently corrected, thereby leading to better optical characteristics.

Embodiment 2

Figure 5:
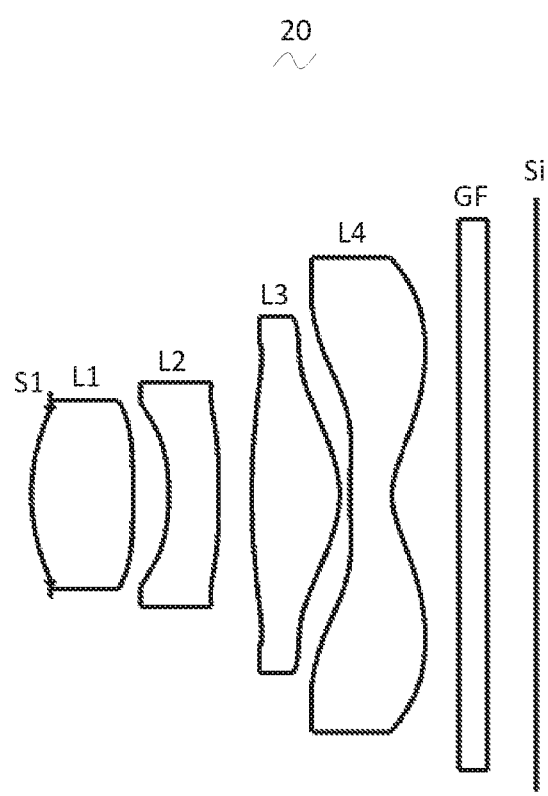
FIG. 5 is a schematic diagram of a structure of a camera optical lens in accordance with Embodiment 2 of the present invention.

Embodiment 2 is basically the same as Embodiment 1 and involves symbols having the same meanings as Embodiment 1. A structure of a camera optical lens 20 in accordance with Embodiment 2 of the present invention is illustrated in FIG. 5, which only describes differences from Embodiment 1.

Table 5 and Table 6 show design data of a camera optical lens 20 in Embodiment 2 of the present invention.

TABLE 5

|  | R |  | d | nd |  | vd |
|---|---|---|---|---|---|---|
| S1 | ∞ | d0= | −0.140 |  |  |  |
| R1 | 1.528 | d1= | 0.759 | nd1 | 1.5444 v1 | 55.82 |
| R2 | −13.487 | d2= | 0.267 |  |  |  |
| R3 | −1.969 | d3= | 0.373 | nd2 | 1.6359 v2 | 23.82 |
| R4 | −12.614 | d4= | 0.246 |  |  |  |
| R5 | 6.448 | d5= | 0.657 | nd3 | 1.5444 v3 | 55.82 |
| R6 | −0.813 | d6= | 0.076 |  |  |  |
| R7 | 3.024 | d7= | 0.315 | nd4 | 1.5438 v4 | 56.03 |
| R8 | 0.563 | d8= | 0.500 |  |  |  |
| R9 | ∞ | d9= | 0.210 | ndg | 1.5168 vg | 64.17 |
| R10 | ∞ | d10= | 0.367 |  |  |  |

Table 6 shows aspheric surface data of respective lenses in the camera optical lens 20 according to Embodiment 2 of the present invention.

TABLE 6

| | Conic coefficient | Aspherical surface coefficients | | | | | | |
|---|---|---|---|---|---|---|---|---|
| | k | A4 | A6 | A8 | A10 | A12 | A14 | A16 |
| R1 | −5.4508E+00 | 1.1170E−01 | 7.1354E−01 | −7.6533E+00 | 3.5458E+01 | −8.9505E+01 | 1.1602E+02 | −6.0915E+01 |
| R2 | −3.8983E+02 | −2.5161E−01 | −1.0676E−01 | 4.0786E−02 | −9.0888E−01 | 2.4631E+00 | −1.6716E−01 | −3.0983E+00 |
| R3 | −1.2922E+01 | −6.8273E−01 | 7.0158E−01 | −2.5226E+00 | 1.0592E+01 | −2.1453E+01 | 2.5675E+01 | −1.5112E+01 |
| R4 | −1.3701E+01 | −1.8750E−01 | −8.3992E−01 | 5.4376E+00 | −1.4614E+01 | 2.2458E+01 | −1.7874E+01 | 5.7001E+00 |
| R5 | −1.8063E+02 | 1.8975E−01 | −6.3765E−01 | 1.1639E+00 | −1.2050E+00 | 7.0137E−01 | −2.0992E−01 | 2.1982E−02 |
| R6 | −1.1361E+00 | 8.5652E−01 | −1.6825E+00 | 2.2251E+00 | −1.6522E+00 | 6.9144E−01 | −1.5692E−01 | 1.5261E−02 |
| R7 | −2.0074E+02 | −3.2423E−01 | −8.3737E−02 | 4.4959E−01 | −3.5549E−01 | 1.3231E−01 | −2.4639E−02 | 1.8588E−03 |
| R8 | −4.9106E+00 | −3.0067E−01 | 2.9931E−01 | −2.1557E−01 | 1.0291E−01 | −3.0400E−02 | 4.8959E−03 | −3.2404E−04 |

Table 7 and Table 8 show design data of inflexion points and arrest points of respective lens in the camera optical lens 20 according to Embodiment 2 of the present invention.

TABLE 7

|  | Number of inflexion points | Inflexion point position 1 | Inflexion point position 2 |
|---|---|---|---|
| P1R1 | 1 | 0.645 | 0 |
| P1R2 | 0 | 0 | 0 |
| P2R1 | 0 | 0 | 0 |
| P2R2 | 1 | 0.625 | 0 |
| P3R1 | 1 | 0.885 | 0 |

TABLE 7-continued

|  | Number of inflexion points | Inflexion point position 1 | Inflexion point position 2 |
|---|---|---|---|
| P3R2 | 2 | 0.665 | 1.165 |
| P4R1 | 2 | 0.195 | 0.955 |
| P4R2 | 1 | 0.395 | 0 |

TABLE 8

|  | Number of arrest points | Arrest point position 1 | Arrest point position 2 |
|---|---|---|---|
| P1R1 | 0 | 0 | 0 |
| P1R2 | 0 | 0 | 0 |
| P2R1 | 0 | 0 | 0 |
| P2R2 | 1 | 0.795 | 0 |
| P3R1 | 1 | 1.095 | 0 |
| P3R2 | 0 | 0 | 0 |
| P4R1 | 2 | 0.355 | 1.605 |
| P4R2 | 1 | 1.135 | 0 |

Figure 6:
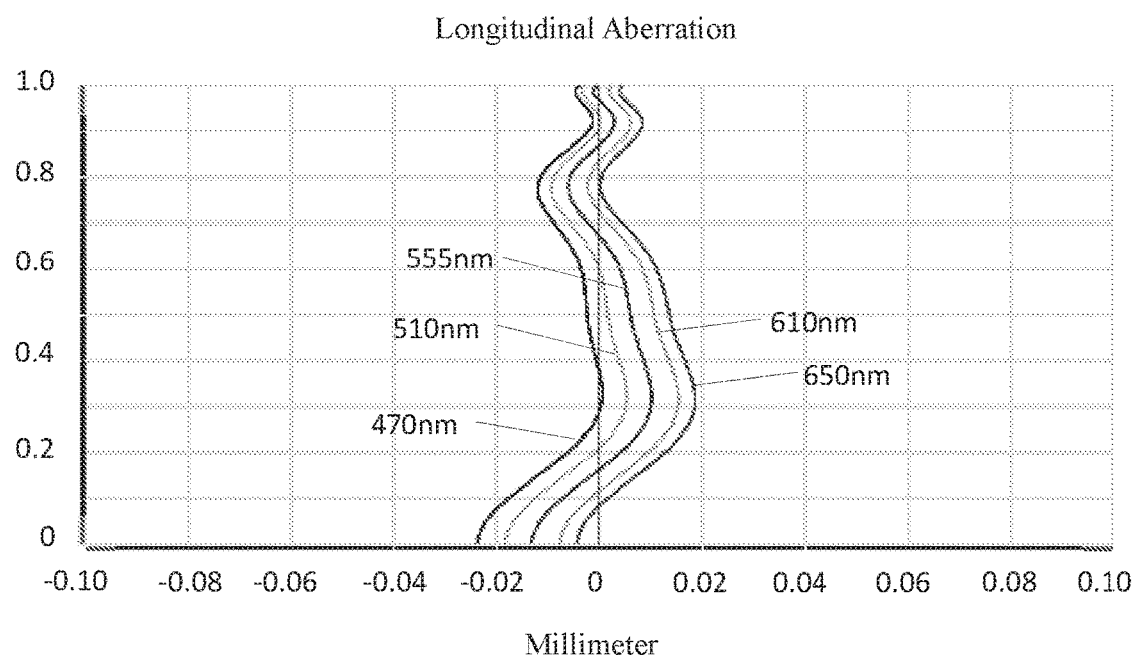
FIG. 6 is a schematic diagram of a longitudinal aberration of the camera optical lens shown in FIG. 5.
Figure 7:
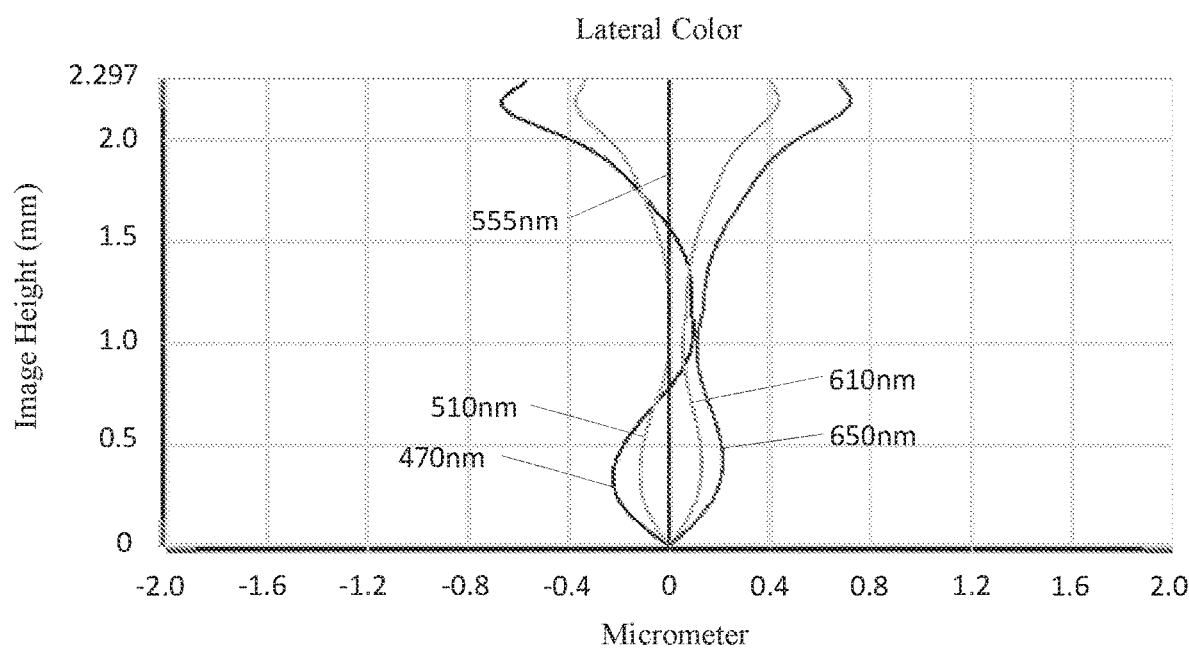
FIG. 7 is a schematic diagram of a lateral color of the camera optical lens shown in FIG. 5.
Figure 8:
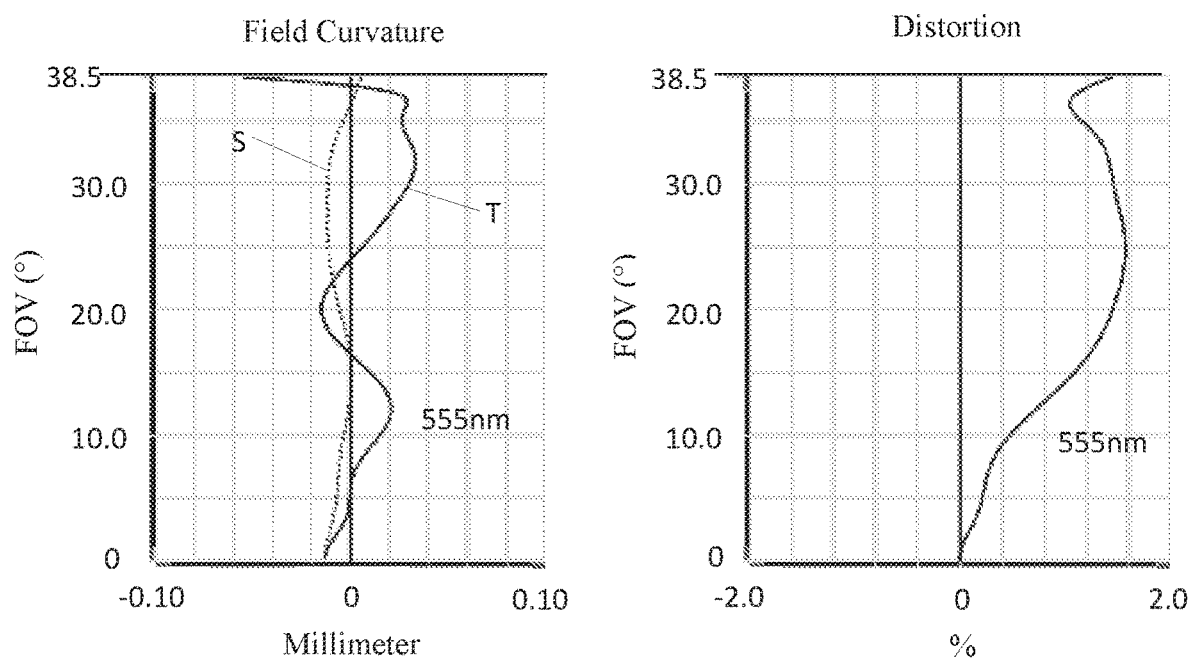
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 470 nm, 510 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2, in which a field curvature S is a field curvature in a sagittal direction and T is a field curvature in a tangential direction.

Table 21 below further lists various values corresponding to the above conditions according to the present embodiment. The camera optical lens 20 according to the present embodiment satisfies the respective conditions.

In this embodiment, the entrance pupil diameter of the camera optical lens 20 is 1.376 mm. The image height of the camera optical lens 20 is 2.297 mm. The FOV (field of view) along a diagonal direction is 77.00°. Thus, the camera optical lens 20 can provide an ultra-thin, wide-angle lens while having on-axis and off-axis aberrations sufficiently corrected, thereby leading to better optical characteristics.

Embodiment 3

Figure 9:
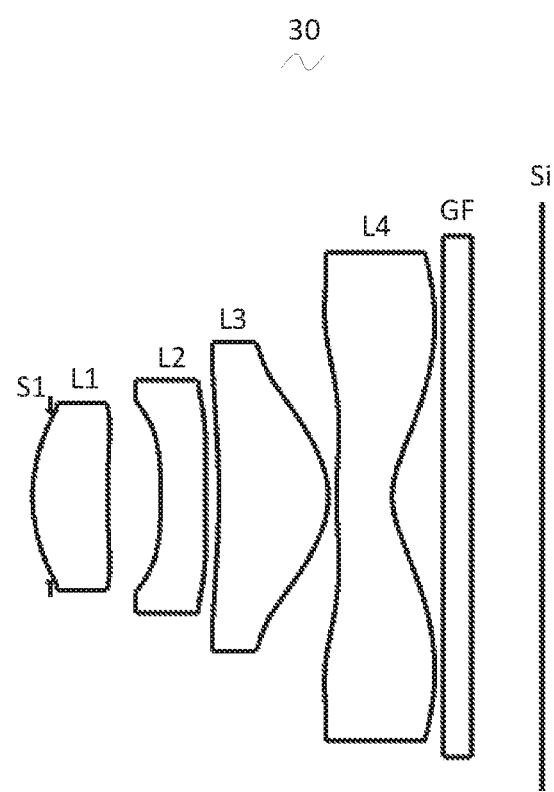
FIG. 9 is a schematic diagram of a structure of a camera optical lens in accordance with Embodiment 3 of the present invention.

Embodiment 3 is basically the same as Embodiment 1 and involves symbols having the same meanings as Embodiment 1. A structure of a camera optical lens 30 in accordance with Embodiment 3 of the present invention is illustrated in FIG. 9, which only describes differences from Embodiment 1.

Table 9 and Table 10 show design data of a camera optical lens 30 in Embodiment 3 of the present invention.

TABLE 9

| | R | d | | nd | | vd | |
|---|---|---|---|---|---|---|---|
| S1 | ∞ | d0= | -0.135 | | | | |
| R1 | 1.367 | d1= | 0.554 | nd1 | 1.5444 | v1 | 55.82 |
| R2 | 5.877 | d2= | 0.395 | | | | |
| R3 | -4.972 | d3= | 0.329 | nd2 | 1.6610 | v2 | 20.53 |
| R4 | 8.427 | d4= | 0.100 | | | | |
| R5 | -8.509 | d5= | 0.811 | nd3 | 1.5444 | v3 | 55.82 |
| R6 | -0.688 | d6= | 0.060 | | | | |
| R7 | 3.088 | d7= | 0.413 | nd4 | 1.5346 | v4 | 55.69 |
| R8 | 0.615 | d8= | 0.375 | | | | |
| R9 | ∞ | d9= | 0.210 | ndg | 1.5168 | vg | 64.17 |
| R10 | ∞ | d10= | 0.523 | | | | |

Table 10 shows aspheric surface data of respective lenses in the camera optical lens 30 according to Embodiment 3 of the present invention.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | -3.0409E+00 | 9.6256E-02 | 3.0749E-01 | -1.6900E+00 | 6.1703E+00 | -1.9161E+01 | 3.5489E+01 | -2.6619E+01 |
| R2 | 3.7713E+01 | -1.4642E-01 | 3.6009E-01 | -2.7363E+00 | 9.3108E+00 | -2.1217E+01 | 2.6666E+01 | -1.4389E+01 |
| R3 | 3.9850E+01 | -3.6081E-01 | 1.0537E-01 | -1.7065E+00 | 1.0564E+01 | -3.1648E+01 | 4.4795E+01 | -2.2502E+01 |
| R4 | -2.5892E+02 | -2.8975E-01 | 3.9285E-01 | -7.2105E-01 | 1.5405E+00 | -2.8428E+00 | 2.9720E+00 | -1.1036E+00 |
| R5 | 4.4701E+01 | -2.2829E-02 | -2.4956E-02 | 5.1726E-01 | -1.0965E+00 | 1.0999E+00 | -5.7376E-01 | 1.2778E-01 |
| R6 | -3.9488E+00 | -4.1008E-01 | 1.0060E+00 | -1.9422E+00 | 2.4824E+00 | -1.7017E+00 | 5.7335E-01 | -7.5131E-02 |
| R7 | -1.4122E+02 | -1.3736E-01 | -7.6177E-03 | 9.1477E-02 | -5.6685E-02 | 1.6041E-02 | -2.2030E-03 | 1.1183E-04 |
| R8 | -4.9791E+00 | -1.6565E-01 | 1.2421E-01 | -7.4134E-02 | 3.0432E-02 | -7.9012E-03 | 1.1581E-03 | -7.2234E-05 |

Table 11 and Table 12 show design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 |
|---|---|---|---|---|
| P1R1 | 1 | 0.675 | 0 | 0 |
| P1R2 | 1 | 0.355 | 0 | 0 |
| P2R1 | 0 | 0 | 0 | 0 |
| P2R2 | 2 | 0.185 | 0.775 | 0 |
| P3R1 | 3 | 0.605 | 0.915 | 0.945 |
| P3R2 | 2 | 0.755 | 1.155 | 0 |
| P4R1 | 3 | 0.265 | 1.045 | 1.665 |
| P4R2 | 1 | 0.465 | 0 | 0 |

TABLE 12

| | Number of arrest points | Arrest point position 1 | Arrest point position 2 |
|---|---|---|---|
| P1R1 | 0 | 0 | 0 |
| P1R2 | 1 | 0.545 | 0 |
| P2R1 | 0 | 0 | 0 |
| P2R2 | 2 | 0.325 | 0.885 |
| P3R1 | 0 | 0 | 0 |
| P3R2 | 0 | 0 | 0 |
| P4R1 | 2 | 0.525 | 1.465 |
| P4R2 | 1 | 1.365 | 0 |

Figure 10:
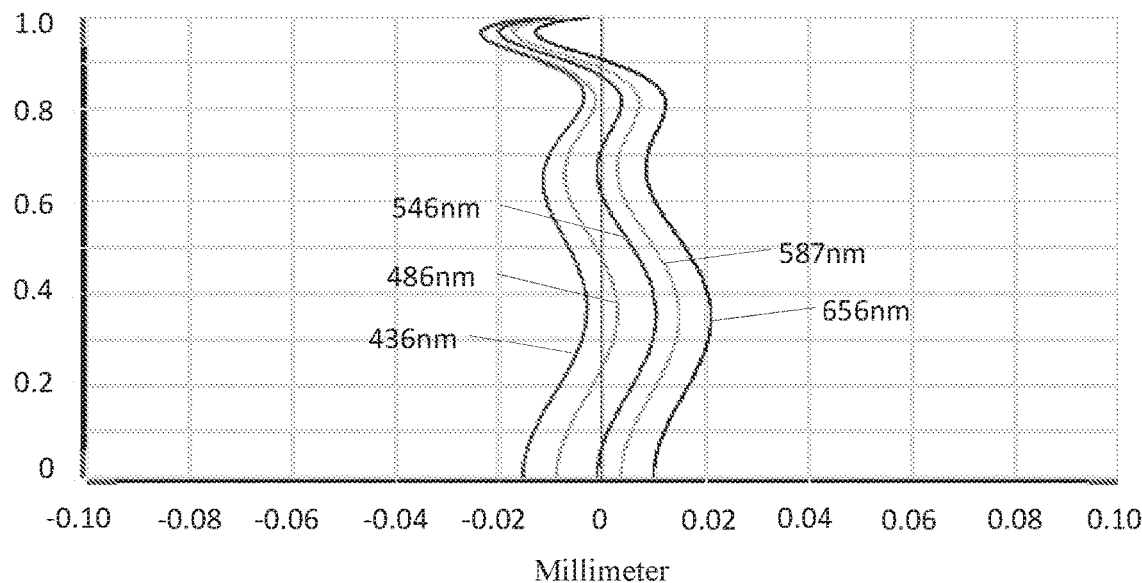
FIG. 10 is a schematic diagram of a longitudinal aberration of the camera optical lens shown in FIG. 9.
Figure 11:
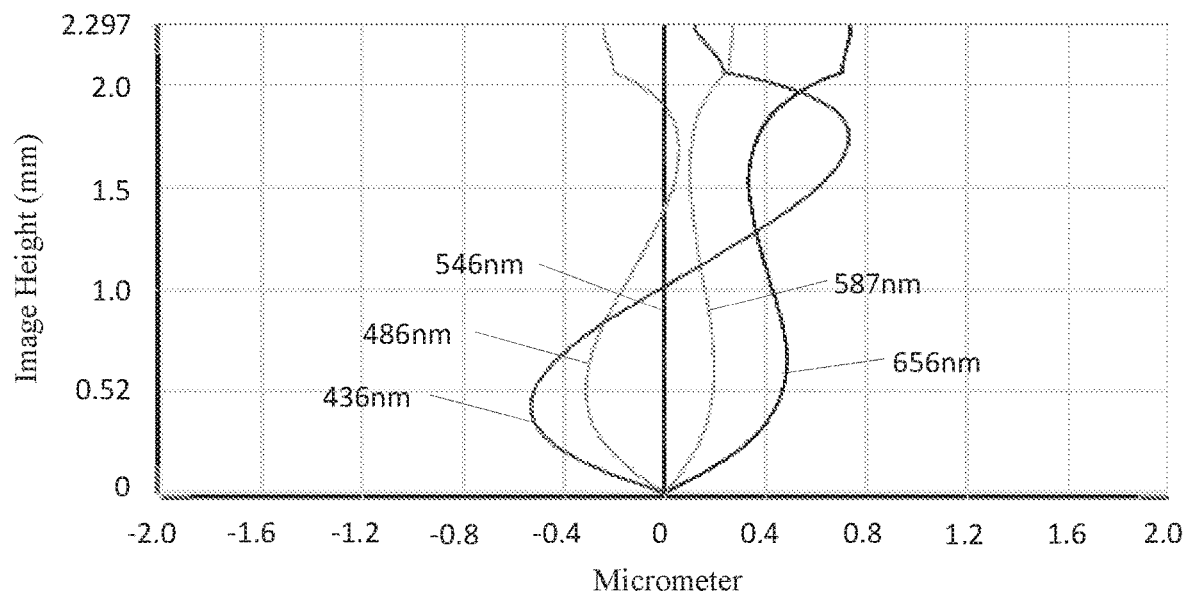
FIG. 11 is a schematic diagram of a lateral color of the camera optical lens shown in FIG. 9.
Figure 12:
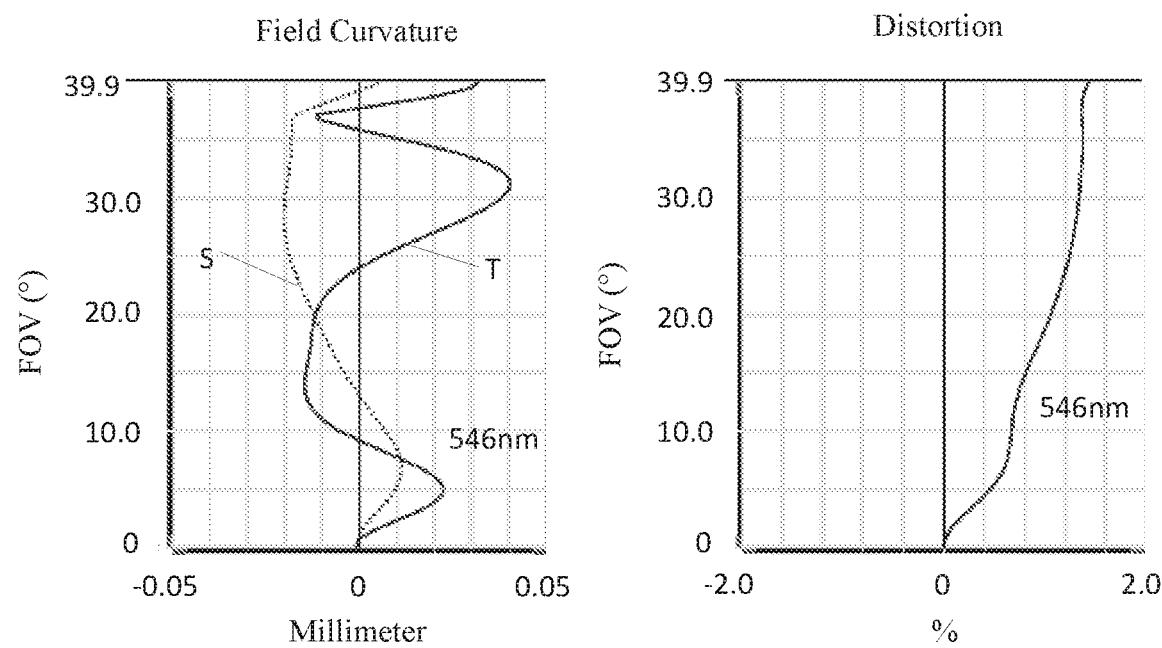
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 436 nm, 486 nm, 546 nm, 587 nm and 656 nm after passing the camera optical lens 30 according to Embodiment 3. FIG. 12 illustrates field curvature and distortion of light with a wavelength of 546 nm after passing the camera optical lens 30 according to Embodiment 3, in which a field curvature S is a field curvature in a sagittal direction and T is a field curvature in a tangential direction.

Table 21 below further lists various values corresponding to the above conditions according to the present embodiment. The camera optical lens 30 according to the present embodiment satisfies the respective conditions.

In this embodiment, the entrance pupil diameter of the camera optical lens 30 is 1.335 mm. The image height of the camera optical lens 30 is 2.297 mm. The FOV (field of view) along a diagonal direction is 79.80°. Thus, the camera optical lens 30 can provide an ultra-thin, wide-angle lens while having on-axis and off-axis aberrations sufficiently corrected, thereby leading to better optical characteristics.

Embodiment 4

Figure 13:
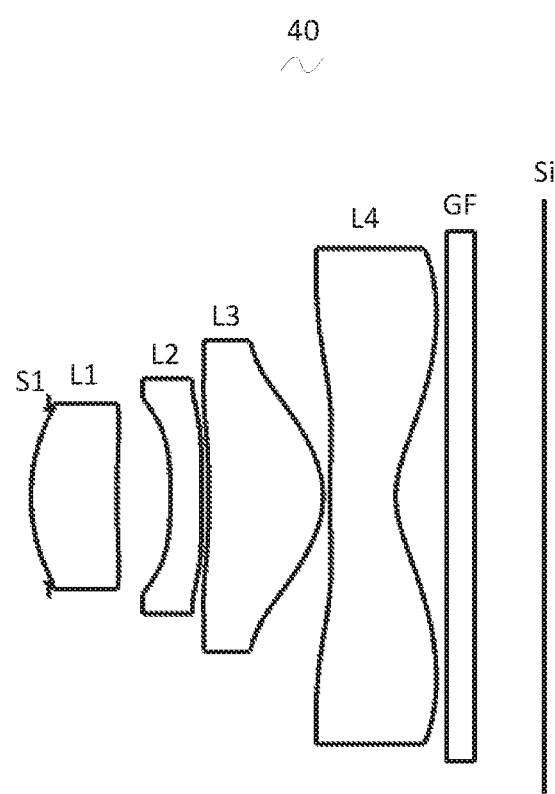
FIG. 13 is a schematic diagram of a structure of a camera optical lens in accordance with Embodiment 4 of the present invention.

Embodiment 4 is basically the same as Embodiment 1 and involves symbols having the same meanings as Embodiment 1. A structure of a camera optical lens 40 in accordance with Embodiment 4 of the present invention is illustrated in FIG. 13, which only describes differences from Embodiment 1.

Table 13 and Table 14 show design data of a camera optical lens 40 in Embodiment 4 of the present invention.

TABLE 13

| | R | d | | nd | | vd | |
|---|---|---|---|---|---|---|---|
| S1 | ∞ | d0= | -0.135 | | | | |
| R1 | 1.426 | d1= | 0.644 | nd1 | 1.5444 | v1 | 55.82 |
| R2 | 6.474 | d2= | 0.403 | | | | |
| R3 | -4.394 | d3= | 0.230 | nd2 | 1.6610 | v2 | 20.53 |
| R4 | 8.490 | d4= | 0.056 | | | | |
| R5 | -8.906 | d5= | 0.858 | nd3 | 1.5444 | v3 | 55.82 |
| R6 | -0.716 | d6= | 0.050 | | | | |
| R7 | 4.271 | d7= | 0.493 | nd4 | 1.5346 | v4 | 55.69 |
| R8 | 0.717 | d8= | 0.382 | | | | |
| R9 | ∞ | d9= | 0.210 | ndg | 1.5168 | vg | 64.17 |
| R10 | ∞ | d10= | 0.523 | | | | |

Table 14 shows aspheric surface data of respective lenses in the camera optical lens 40 according to Embodiment 4 of the present invention.

TABLE 14

| | Conic coefficient | Aspherical surface coefficients | | | | | | |
|---|---|---|---|---|---|---|---|---|
| | k | A4 | A6 | A8 | A10 | A12 | A14 | A16 |
| R1 | −8.1596E+00 | 2.6195E−01 | 1.3491E−01 | −2.1258E+00 | 8.0486E+00 | −1.9286E+01 | 2.7780E+01 | −1.7616E+01 |
| R2 | 7.1537E+01 | −1.9032E−01 | 5.5613E−01 | −2.6670E+00 | 7.3471E+00 | −1.9676E+01 | 3.4999E+01 | −2.6211E+01 |
| R3 | 2.4538E+01 | −5.0011E−01 | 3.9754E−01 | −2.4278E+00 | 1.1056E+01 | −2.9632E+01 | 4.4850E+01 | −2.6771E+01 |
| R4 | −9.3594E+02 | −3.9242E−01 | 3.9976E−01 | −6.1644E−01 | 1.7112E+00 | −2.8370E+00 | 2.7179E+00 | −1.0530E+00 |
| R5 | 6.5394E+01 | −1.1846E−01 | 1.0404E−01 | 5.8618E−01 | −1.1836E+00 | 1.0437E+00 | −4.9840E−01 | 1.1056E−01 |
| R6 | −3.7112E+00 | −4.3583E−01 | 1.0276E+00 | −1.9491E+00 | 2.4773E+00 | −1.6979E+00 | 5.7736E−01 | −7.7499E−02 |
| R7 | −2.6721E+02 | −1.1706E−01 | −9.5612E−03 | 8.9382E−02 | −5.7659E−02 | 1.6046E−02 | −1.8574E−03 | 3.4521E−05 |
| R8 | −5.1768E+00 | −1.5379E−01 | 1.1955E−01 | −7.3702E−02 | 3.0717E−02 | −7.9318E−03 | 1.1286E−03 | −6.7516E−05 |

Table 15 and Table 16 show design data of inflexion points and arrest points of respective lens in the camera optical lens 40 according to Embodiment 4 of the present invention.

TABLE 15

| | Number of inflexion points | Inflexion point position 1 | Inflexion point position 2 | Inflexion point position 3 |
|---|---|---|---|---|
| P1R1 | 0 | 0 | 0 | 0 |
| P1R2 | 1 | 0.365 | 0 | 0 |
| P2R1 | 0 | 0 | 0 | 0 |
| P2R2 | 2 | 0.145 | 0.715 | 0 |
| P3R1 | 2 | 0.565 | 0.995 | 0 |
| P3R2 | 2 | 0.765 | 1.175 | 0 |
| P4R1 | 3 | 0.255 | 1.055 | 1.525 |
| P4R2 | 1 | 0.485 | 0 | 0 |

TABLE 16

| | Number of arrest points | Arrest point position 1 | Arrest point position 2 |
|---|---|---|---|
| P1R1 | 0 | 0 | 0 |
| P1R2 | 1 | 0.555 | 0 |
| P2R1 | 0 | 0 | 0 |
| P2R2 | 2 | 0.245 | 0.875 |
| P3R1 | 2 | 0.845 | 1.055 |
| P3R2 | 0 | 0 | 0 |
| P4R1 | 1 | 0.495 | 0 |
| P4R2 | 1 | 1.415 | 0 |

Figure 14:
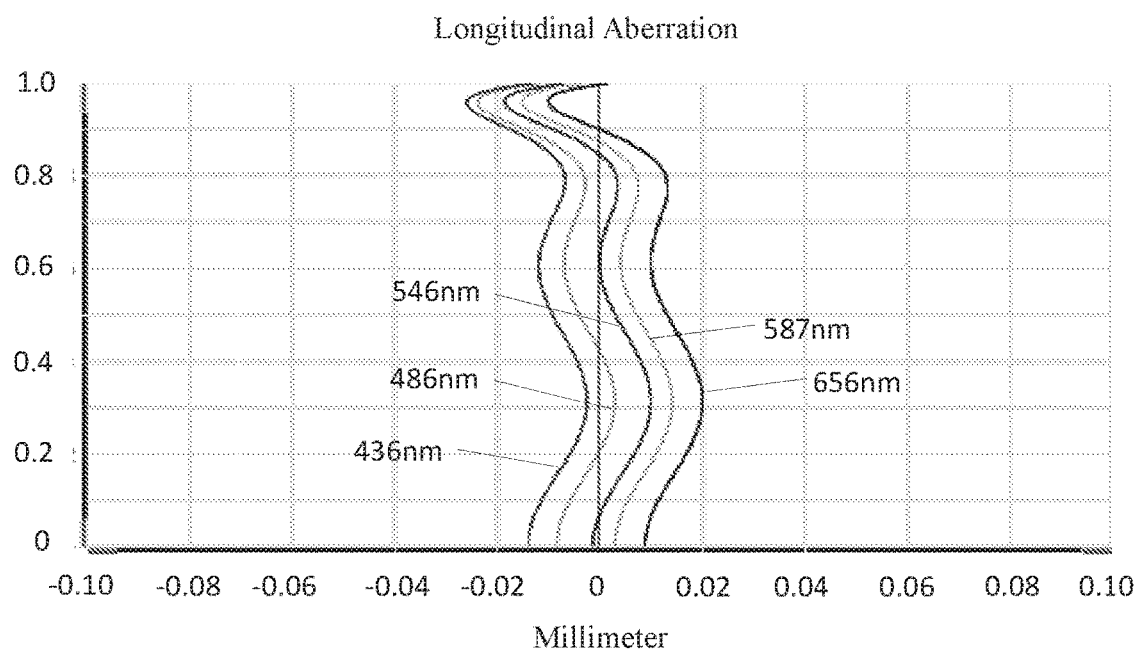
FIG. 14 is a schematic diagram of a longitudinal aberration of the camera optical lens shown in FIG. 13.
Figure 15:
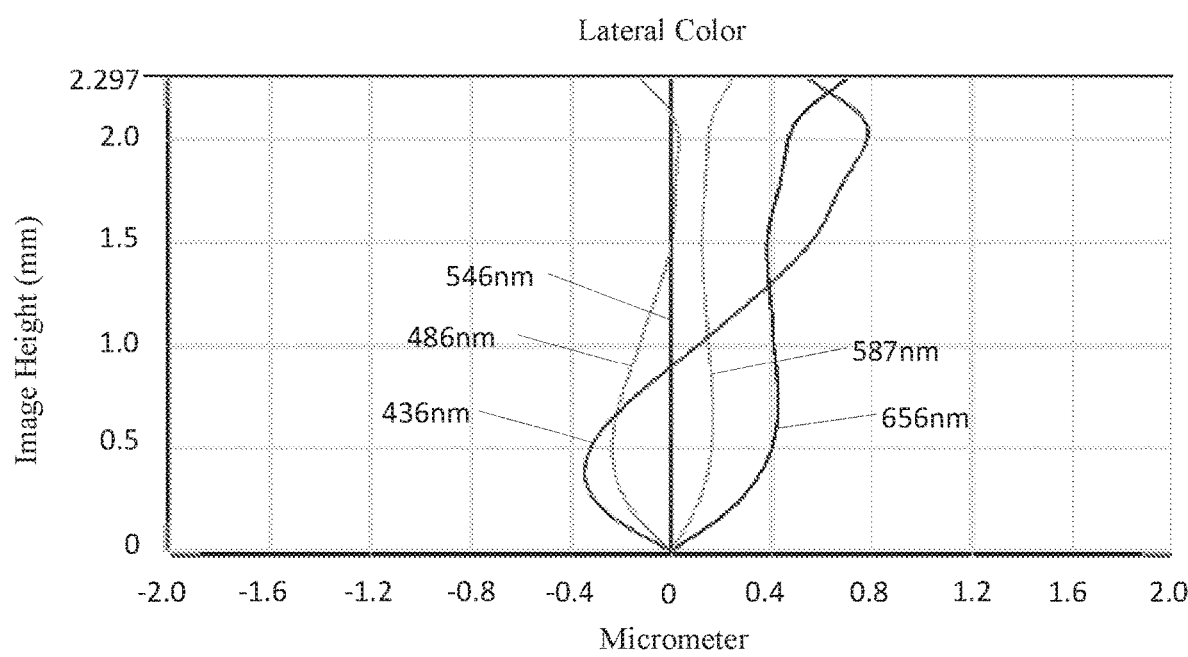
FIG. 15 is a schematic diagram of a lateral color of the camera optical lens shown in FIG. 13.
Figure 16:
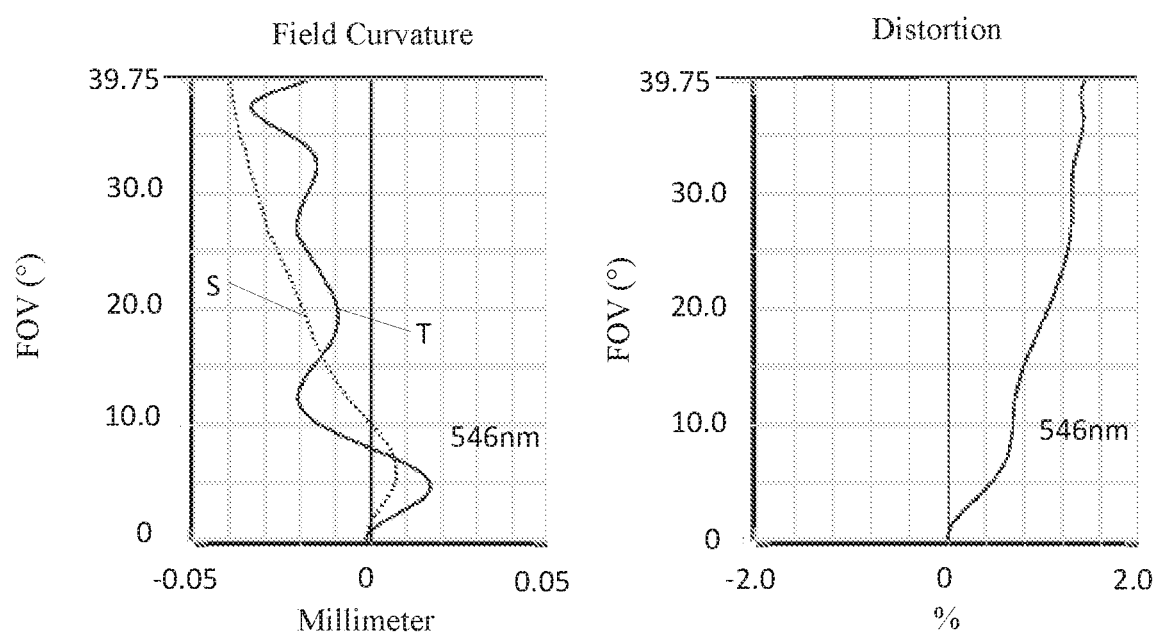
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 436 nm, 486 nm, 546 nm, 587 nm and 656 nm after passing the camera optical lens 40 according to Embodiment 4. FIG. 16 illustrates field curvature and distortion of light with a wavelength of 546 nm after passing the camera optical lens 40 according to Embodiment 4, in which a field curvature S is a field curvature in a sagittal direction and T is a field curvature in a tangential direction.

Table 21 below further lists various values corresponding to the above conditions according to the present embodiment. The camera optical lens 40 according to the present embodiment satisfies the respective conditions.

In this embodiment, the entrance pupil diameter of the camera optical lens 40 is 1.345 mm. The image height of the camera optical lens 40 is 2.297 mm. The FOV (field of view) along a diagonal direction is 79.50°. Thus, the camera optical lens 40 can provide an ultra-thin, wide-angle lens while having on-axis and off-axis aberrations sufficiently corrected, thereby leading to better optical characteristics.

Embodiment 5

Figure 17:
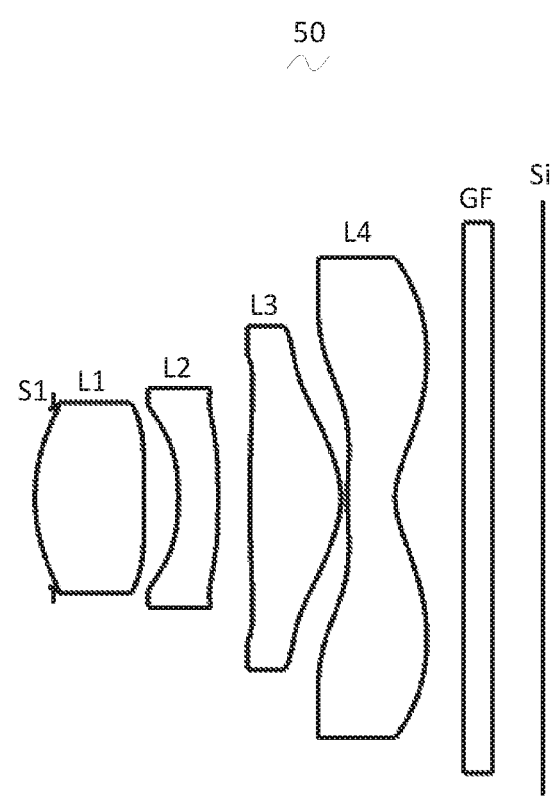
FIG. 17 is a schematic diagram of a structure of a camera optical lens in accordance with Embodiment 5 of the present invention.

Embodiment 5 is basically the same as Embodiment 1 and involves symbols having the same meanings as Embodiment 1. A structure of a camera optical lens 50 in accordance with Embodiment 5 of the present invention is illustrated in FIG. 17, which only describes differences from Embodiment 1.

Table 17 and Table 18 show design data of a camera optical lens 50 in Embodiment 5 of the present invention.

TABLE 17

| | R | d | | nd | | vd |
|---|---|---|---|---|---|---|
| S1 | ∞ | d0= | −0.140 | | | |
| R1 | 1.403 | d1= | 0.802 | nd1 | 1.5444 v1 | 55.82 |
| R2 | 156.843 | d2= | 0.251 | | | |
| R3 | −1.917 | d3= | 0.291 | nd2 | 1.6359 v2 | 23.82 |
| R4 | −9.986 | d4= | 0.234 | | | |
| R5 | 21.102 | d5= | 0.668 | nd3 | 1.5444 v3 | 55.82 |
| R6 | −0.762 | d6= | 0.048 | | | |
| R7 | 2.828 | d7= | 0.350 | nd4 | 1.5438 v4 | 56.03 |
| R8 | 0.563 | d8= | 0.506 | | | |
| R9 | ∞ | d9= | 0.210 | ndg | 1.5168 vg | 64.17 |
| R10 | ∞ | d10= | 0.367 | | | |

Table 18 shows aspheric surface data of respective lenses in the camera optical lens 50 according to Embodiment 5 of the present invention.

TABLE 18

| | Conic coefficient | Aspherical surface coefficients | | | | | | |
|---|---|---|---|---|---|---|---|---|
| | k | A4 | A6 | A8 | A10 | A12 | A14 | A16 |
| R1 | −7.4593E+00 | 2.0878E−01 | 7.4588E−01 | −7.8961E+00 | 3.5555E+01 | −8.8912E+01 | 1.1603E+02 | −6.1859E+01 |
| R2 | 9.9771E+02 | −2.7407E−01 | −1.5490E−02 | −1.5315E−01 | −1.3824E+00 | 2.9653E+00 | 1.5325E+00 | −4.3968E+00 |
| R3 | −4.6752E+01 | −1.1380E+00 | 1.3838E+00 | −2.3102E+00 | 8.9457E+00 | −2.1246E+01 | 3.0210E+01 | −1.9240E+01 |
| R4 | 5.0186E+01 | −2.5708E−01 | −7.3865E−01 | 5.3829E+00 | −1.4297E+01 | 2.2599E+01 | −1.8661E+01 | 6.1077E+00 |
| R5 | −1.0236E+01 | 1.6693E−01 | −6.5662E−01 | 1.1850E+00 | −1.2115E+00 | 6.9651E−01 | −2.1019E−01 | 1.9958E−02 |
| R6 | −1.1545E+00 | 8.5232E−01 | −1.6828E+00 | 2.2238E+00 | −1.6534E+00 | 6.9132E−01 | −1.5661E−01 | 1.5138E−02 |
| R7 | −2.1781E+02 | −3.0640E−01 | −8.3950E−02 | 4.4942E−01 | −3.5547E−01 | 1.3226E−01 | −2.4666E−02 | 1.8588E−03 |
| R8 | −5.2225E+00 | −3.0017E−01 | 2.9812E−01 | −2.1625E−01 | 1.0328E−01 | −3.0315E−02 | 4.8819E−03 | −3.2744E−04 |

Table 19 and Table 20 show design data of inflexion points and arrest points of respective lens in the camera optical lens 50 according to Embodiment 5 of the present invention.

TABLE 19

| | Number of inflexion points | Inflexion point position 1 | Inflexion point position 2 | Inflexion point position 3 |
|---|---|---|---|---|
| P1R1 | 1 | 0.685 | 0 | 0 |
| P1R2 | 1 | 0.045 | 0 | 0 |
| P2R1 | 2 | 0.665 | 0.705 | 0 |
| P2R2 | 1 | 0.585 | 0 | 0 |
| P3R1 | 1 | 0.515 | 0 | 0 |
| P3R2 | 2 | 0.685 | 1.125 | 0 |
| P4R1 | 3 | 0.195 | 0.925 | 1.555 |
| P4R2 | 1 | 0.385 | 0 | 0 |

TABLE 20

| | Number of arrest points | Arrest point position 1 |
|---|---|---|
| P1R1 | 0 | 0 |
| P1R2 | 1 | 0.075 |
| P2R1 | 0 | 0 |
| P2R2 | 1 | 0.755 |
| P3R1 | 1 | 0.865 |
| P3R2 | 0 | 0 |
| P4R1 | 1 | 0.365 |
| P4R2 | 1 | 1.095 |

Figure 18:
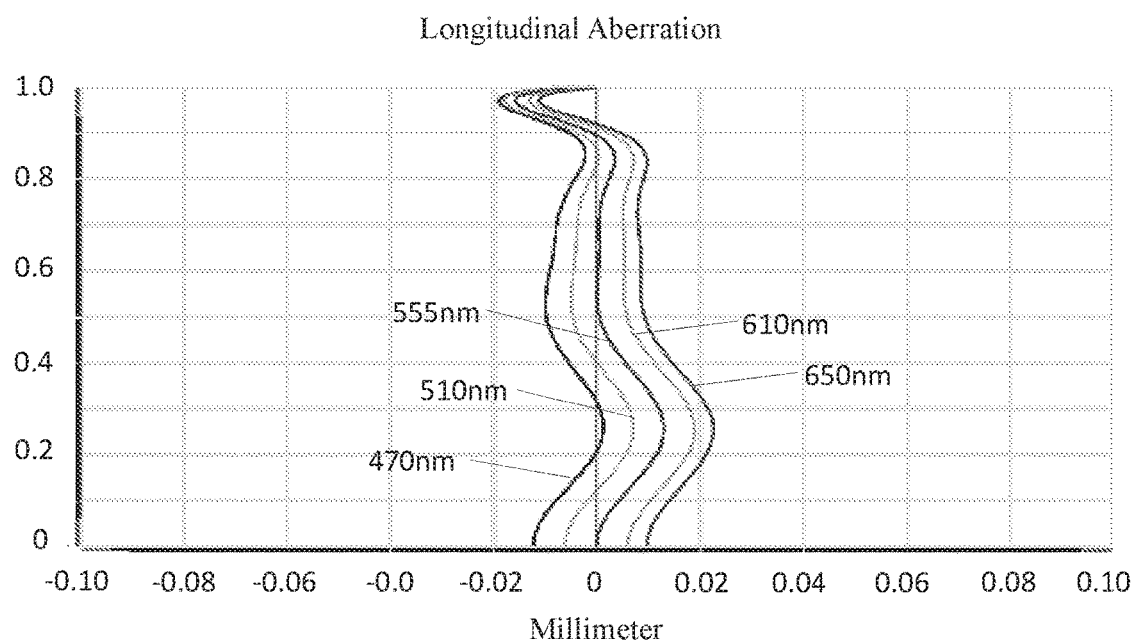
FIG. 18 is a schematic diagram of a longitudinal aberration of the camera optical lens shown in FIG. 17.
Figure 19:
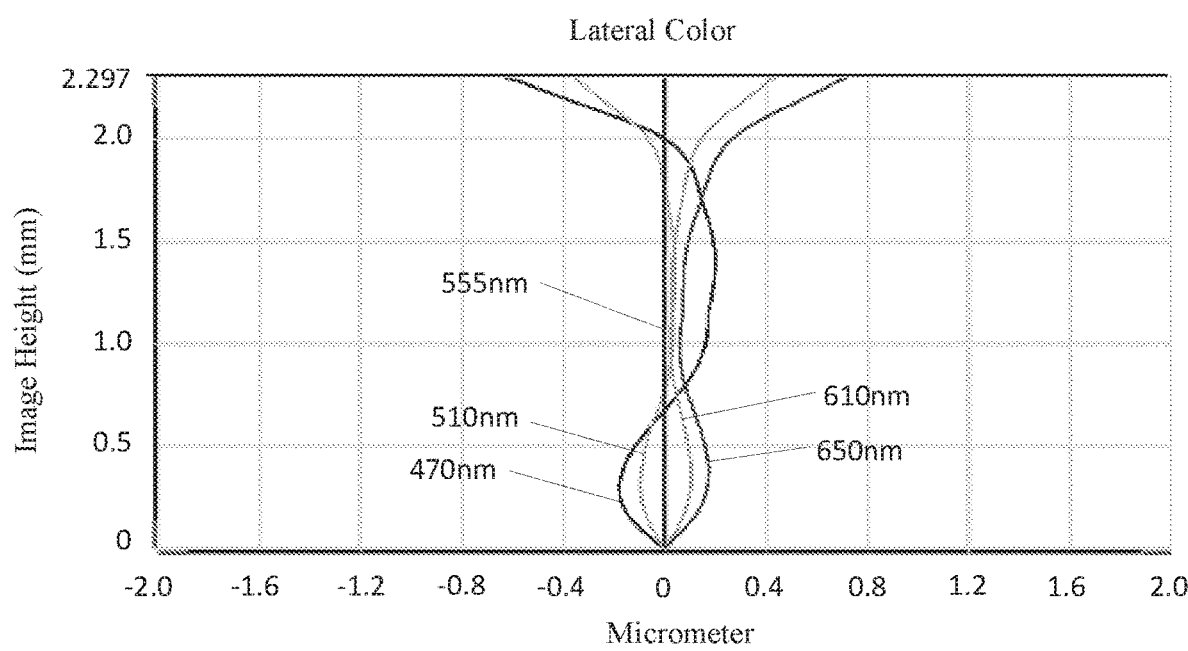
FIG. 19 is a schematic diagram of a lateral color of the camera optical lens shown in FIG. 17.
Figure 20:
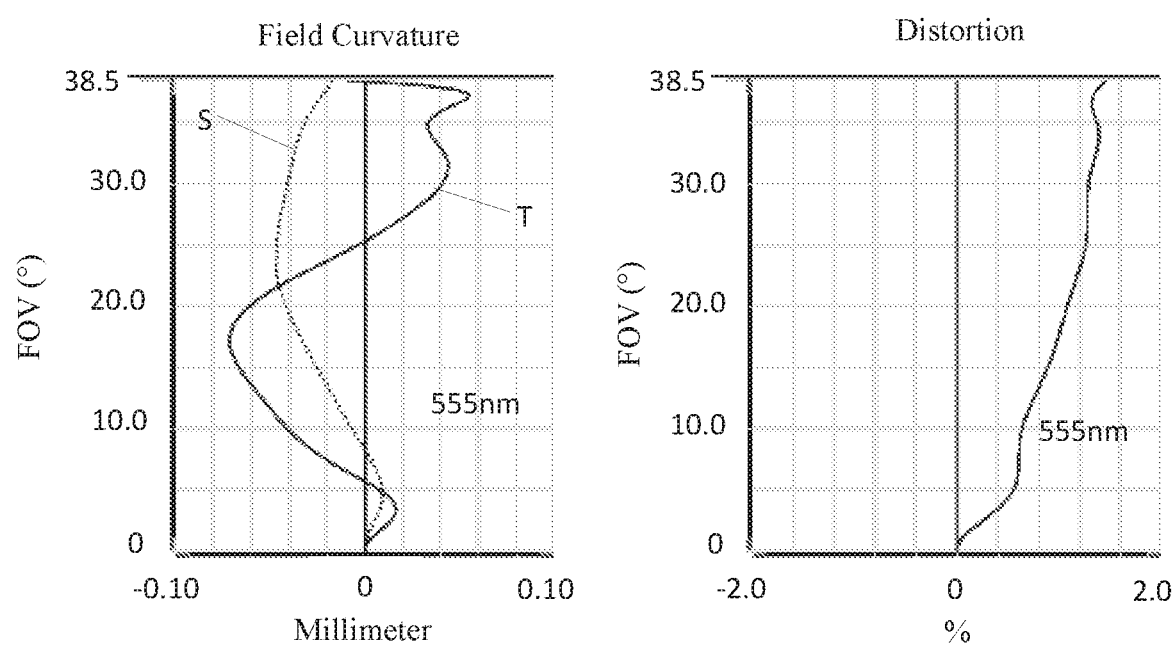
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 470 nm, 510 nm, 555 nm, 610 nm and 650 nm after passing the camera optical lens 50 according to Embodiment 5. FIG. 20 illustrates field curvature and distortion of light with a wavelength of 555 nm after passing the camera optical lens 50 according to Embodiment 5, in which a field curvature S is a field curvature in a sagittal direction and T is a field curvature in a tangential direction.

Table 21 below further lists various values corresponding to the above conditions according to the present embodiment. The camera optical lens 50 according to the present embodiment satisfies the respective conditions.

In this embodiment, the entrance pupil diameter of the camera optical lens 50 is 1.383 mm. The image height of the camera optical lens 50 is 2.297 mm. The FOV (field of view) along a diagonal direction is 77.00°. Thus, the camera optical lens 50 can provide an ultra-thin, wide-angle lens while having on-axis and off-axis aberrations sufficiently corrected, thereby leading to better optical characteristics.

TABLE 21

| Parameters and Conditions | Embodiment 1 | Embodiment 2 | Embodiment 3 | Embodiment 4 | Embodiment 5 |
|---|---|---|---|---|---|
| f | 2.712 | 2.808 | 2.683 | 2.703 | 2.822 |
| f1 | 3.127 | 2.559 | 3.121 | 3.200 | 2.587 |
| f2 | −4.397 | −3.693 | −4.632 | −4.300 | −3.756 |
| f3 | 1.273 | 1.365 | 1.321 | 1.373 | 1.362 |
| f4 | −1.462 | −1.329 | −1.519 | −1.686 | −1.364 |
| f12 | 6.604 | 5.227 | 5.960 | 6.677 | 5.116 |
| f1/f2 | −0.71 | −0.69 | −0.67 | −0.74 | −0.69 |
| f4/f2 | 0.33 | 0.36 | 0.33 | 0.39 | 0.36 |
| R7/R8 | 5.28 | 5.37 | 5.02 | 5.96 | 5.02 |
| d1/d2 | 1.64 | 2.84 | 1.40 | 1.60 | 3.20 |
| Fno | 2.01 | 2.04 | 2.01 | 2.01 | 2.04 | where Fno denotes an F number of the camera optical lens.

It can be appreciated by one having ordinary skill in the art that the description above is only embodiments of the present invention. In practice, one having ordinary skill in the art can make various modifications to these embodiments in forms and details without departing from the spirit and scope of the present invention.

What is claimed is:

1. A camera optical lens, comprising, sequentially from an object side to an image side:
   a first lens having a positive refractive power;
   a second lens having a negative refractive power;
   a third lens having a positive refractive power; and
   a fourth lens having a negative refractive power,
   wherein the camera optical lens satisfies following conditions:

$-0.75 \leq f1/f2 \leq -0.67$;

$0.32 \leq f4/f2 \leq 0.40$;

$-0.34 \leq (R3+R4)/(R3-R4) \leq -0.17$;

$5.00 \leq R7/R8 \leq 6.00$; and $1.40 \leq d1/d2 \leq 3.20$, where
   f1 denotes a focal length of the first lens;
   f2 denotes a focal length of the second lens;
   f4 denotes a focal length of the fourth lens;
   R3 denotes a curvature radius of the object side surface of the second lens;
   R4 denotes a curvature radius of an image side surface of the second lens;
   R7 denotes a curvature radius of an object side surface of the fourth lens;
   R8 denotes a curvature radius of an image side surface of the fourth lens;
   d1 denotes an on-axis thickness of the first lens; and
   d2 denotes an on-axis distance from an image side surface of the first lens to an object side surface of the second lens.

2. The camera optical lens as described in claim 1, further satisfying a following condition:

$-0.60 \leq R3/R4 \leq 0.20$, where
   R3 denotes a curvature radius of the object side surface of the second lens; and
   R4 denotes a curvature radius of an image side surface of the second lens.

3. The camera optical lens as described in claim 1, further satisfying following conditions:

$0.46 \leq f1/f \leq 1.78$;

$-3.21 \leq (R1+R2)/(R1-R2) \leq -0.53$; and $0.07 \leq d1/TTL \leq 0.32$, where
   f denotes a focal length of the camera optical lens;
   R1 denotes a curvature radius of an object side surface of the first lens;
   R2 denotes a curvature radius of the image side surface of the first lens; and
   TTL denotes a total optical length from the object side surface of the first lens to an image plane of the camera optical lens along an optic axis.

4. The camera optical lens as described in claim 1, further satisfying following conditions:

$-3.45 \leq f2/f \leq -0.88$;

and $0.03 \leq d3/TTL \leq 0.15$, where f denotes a focal length of the camera optical lens;
d3 denotes an on-axis thickness of the second lens; and
TTL denotes a total optical length from an object side surface of the first lens to an image plane of the camera optical lens along an optic axis.

5. The camera optical lens as described in claim 1, further satisfying following conditions:

$0.23 \leq f3/f \leq 0.76$;

$0.39 \leq (R5+R6)/(R5-R6) \leq 1.76$; and $0.09 \leq d5/TTL \leq 0.33$, where f denotes a focal length of the camera optical lens;
f3 denotes a focal length of the third lens;
R5 denotes a curvature radius of an object side surface of the third lens;
R6 denotes a curvature radius of an image side surface of the third lens;
d5 denotes an on-axis thickness of the third lens; and
TTL denotes a total optical length from an object side surface of the first lens to an image plane of the camera optical lens along an optic axis.

6. The camera optical lens as described in claim 1, further satisfying following conditions:

$-1.25 \leq f4/f \leq -0.32$;

$0.70 \leq (R7+R8)/(R7-R8) \leq 2.25$; and $0.04 \leq d7/TTL \leq 0.19$, where f denotes a focal length of the camera optical lens;
d7 denotes an on-axis thickness of the fourth lens; and
TTL denotes a total optical length from an object side surface of the first lens to an image plane of the camera optical lens along an optic axis.

7. The camera optical lens as described in claim 1, further satisfying a following condition:

$TTL/IH \leq 1.68$, where

TTL denotes a total optical length from an object side surface of the first lens to an image plane of the camera optical lens along an optic axis; and
IH denotes an image height of the camera optical lens.

8. The camera optical lens as described in claim 1, further satisfying a following condition:

$0.91 \leq f12/f \leq 3.71$, where f denotes a focal length of the camera optical lens; and
f12 denotes a combined focal length of the first lens and the second lens.

* * * * *